US008944890B2

(12) United States Patent
Ochi et al.

(10) Patent No.: US 8,944,890 B2
(45) Date of Patent: Feb. 3, 2015

(54) INTERNAL GEAR GRINDING MACHINE AND DRESSING METHOD FOR BARREL-SHAPED THREADED TOOL

(75) Inventors: Masashi Ochi, Ritto (JP); Yoshikoto Yanase, Ritto (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 676 days.

(21) Appl. No.: 13/141,250

(22) PCT Filed: Dec. 16, 2009

(86) PCT No.: PCT/JP2009/070955
§ 371 (c)(1),
(2), (4) Date: Jul. 19, 2011

(87) PCT Pub. No.: WO2010/073944
PCT Pub. Date: Jul. 1, 2010

(65) Prior Publication Data
US 2011/0275290 A1      Nov. 10, 2011

(30) Foreign Application Priority Data
Dec. 22, 2008   (JP) ................................ 2008-325633

(51) Int. Cl.
*B24B 1/00*     (2006.01)
*B24B 53/12*    (2006.01)
(Continued)

(52) U.S. Cl.
CPC . *B24B 53/12* (2013.01); *B23F 5/04* (2013.01); *B23F 23/1225* (2013.01); *B24B 53/075* (2013.01)
USPC .................... 451/47; 451/51; 451/56; 451/61

(58) Field of Classification Search
USPC ......... 407/23, 24, 26; 409/65, 66; 451/47, 51, 451/56, 61, 114, 147, 443, 444, 547
See application file for complete search history.

(56) References Cited

U.S. PATENT DOCUMENTS 4,635,404 A * 1/1987 Wirz ............................. 451/250
4,815,239 A * 3/1989 Sommer ........................... 451/5
(Continued)

FOREIGN PATENT DOCUMENTS

| JP | 10-230460 A | 9/1998 |
| JP | 2008-519699 A | 6/2008 |

OTHER PUBLICATIONS

Shigeru Hoyashita, "Barrel Worm-Shaped Tool with Conjugate Cutting-Edge Profile Generated from Tooth Profile of Internal Gear", Transactions of the Japan Society of Mechanical Engineers C, Jan. 1996, vol. 62, No. 593, pp. 284-290.

*Primary Examiner* — Timothy V Eley
(74) *Attorney, Agent, or Firm* — Birch, Stewart, Kolasch & Birch, LLP (57) ABSTRACT

An object is to provide an internal gear grinding machine and a dressing method for a barrel-shaped threaded tool which make it possible to achieve space savings and reduce the size of a machine by simplifying dressing operation. To achieve the object, an internal gear grinding machine for use in grinding a workpiece (W) by synchronously rotating the workpiece (W) and a barrel-shaped threaded grinding wheel (17) in mesh with each other includes a dressing device (20) for dressing the threaded tool (17) by meshing the threaded grinding wheel (17) with a disk dresser (56). At the time of dressing, the threaded grinding wheel (17) and the disc dresser (56) are operated in accordance with the helix angle and the barrel shape of the threaded grinding wheel (17).

2 Claims, 10 Drawing Sheets

(51) Int. Cl.
    *B23F 5/04*     (2006.01)
    *B23F 23/12*     (2006.01)
    *B24B 53/075*     (2006.01)

(56) References Cited

U.S. PATENT DOCUMENTS

| | | | |
|---|---|---|---|
| 5,175,962 A * | 1/1993 | Pedersen | 451/5 |
| 5,413,520 A * | 5/1995 | Feisel | 451/1 |
| 5,738,569 A * | 4/1998 | Mackowsky | 451/56 |
| 5,857,896 A * | 1/1999 | Stollberg | 451/47 |
| 6,077,150 A | 6/2000 | Jankowski | |
| 6,217,409 B1 * | 4/2001 | Stadtfeld et al. | 451/5 |
| 6,565,418 B1 * | 5/2003 | Feisel | 451/10 |
| 6,796,878 B2 * | 9/2004 | Mitsuzono et al. | 451/5 |
| 6,951,501 B2 * | 10/2005 | Tan | 451/5 |
| 7,341,501 B2 * | 3/2008 | Yanase et al. | 451/5 |
| 2003/0027507 A1 | 2/2003 | Stollberg | |
| 2008/0268750 A1 | 10/2008 | Fisher et al. | |
| 2011/0067683 A1 * | 3/2011 | O'Malley | 125/11.03 |

* cited by examiner

INTERNAL GEAR GRINDING MACHINE AND DRESSING METHOD FOR BARREL-SHAPED THREADED TOOL

TECHNICAL FIELD

The present invention relates to an internal gear grinding machine for grinding an internal gear with a barrel-shaped threaded tool, and particularly to an internal gear grinding machine having the dressing function of dressing a barrel-shaped threaded tool and a dressing method for a barrel-shaped threaded tool.

BACKGROUND ART

In general, a gear machining process includes: forming a gear by machining a predetermined material of the gear by gear cutting; heat-treating the machined gear; and then finishing (grinding) the gear to remove distortion and the like due to this heat treatment. Heretofore, various tooth grinding methods using tools such as WA grinding wheels and superabrasive (diamond, CBN, and the like) grinding wheels have been provided to efficiently finish the faces of the teeth of a heat-treated gear. Moreover, tools for use in these methods are in external gear form, internal gear form, screw (worm) form, and the like which are chosen in accordance with the form of a gear to be ground.

On the other hand, of gears, internal gears are frequently used in automotive transmissions and the like. Recently, there has been a demand for the improvement of machining accuracy for the purpose of reducing the vibration and noise of such transmissions. Accordingly, internal gear grinding methods for finish-grinding an internal gear with a barrel-shaped threaded grinding wheel with high accuracy have been heretofore disclosed, for example, in Non-Patent Literature 1.

PRIOR ART DOCUMENT

Non-Patent Document

Non-Patent Document 1: Shigeru Hoyashita, "Barrel Worm-Shaped Tool with Conjugate Cutting-Edge Profile Generated from Tooth Profile of Internal Gear [in Japanese]," January, 1996, Transactions of the Japan Society of Mechanical Engineers C, Vol. 62, No. 593, pp. 284-290

SUMMARY OF THE INVENTION

Problem to be Solved by the Invention

What should be noted here is that grinding a certain number of internal gears causes a decrease in sharpness of a threaded grinding wheel due to the wear of the faces of the threads thereof. To address this decrease, dressing needs to be carried out on a regular basis. Thus, it is considered that dressing the threaded grinding wheel with high accuracy leads to grinding an internal gear with high accuracy.

Of gear grinding machines provided, some include a dressing device for dressing a worn grinding wheel with a dresser. However, in the case where a dressing device for dressing a barrel-shaped threaded grinding wheel for grinding an internal gear is provided, dressing operation is complex due to limitations associated with the shape of an internal gear if this dressing device is just placed in an internal gear grinding machine. This may increase the size of the machine.

Accordingly, the present invention has been made to solve the above-described problems, and an object of the present invention is to provide an internal gear grinding machine and a dressing method for a barrel-shaped threaded tool which make it possible to achieve space savings and reduce the size of a machine by simplifying dressing operation.

Means for Solving the Problems

An internal gear grinding machine according to a first invention to solve the above-described problem is an internal gear grinding machine for use in grinding a to-be-machined internal gear by synchronously rotating the to-be-machined internal gear and a barrel-shaped threaded tool in mesh with each other, the to-be-machined internal gear being rotatable about a work rotation axis, the barrel-shaped threaded tool being rotatable about a tool rotation axis having a predetermined crossed axes angle with respect to the work rotation axis, the gear grinding machine comprising: dressing means for dressing the threaded tool by meshing the threaded tool with a disk-shaped dresser rotatable about a dresser rotation axis, the dressing means comprising: dresser turning means for turning the dresser about a dresser pivot axis perpendicular to the dresser rotation axis; tool rotating means for rotating the threaded tool about the tool rotation axis; tool vertically-moving means for moving the threaded tool in a vertical direction; tool horizontally-moving means for moving the threaded tool to adjust a distance between the tool rotation axis and the dresser rotation axis; and tool laterally-moving means for moving the threaded tool in a direction perpendicular to both the tool rotation axis and a horizontal direction, the dresser turning means, the tool rotating means, the tool vertically-moving means, the tool horizontally-moving means, and the tool laterally-moving means being driven in accordance with the shape of the threaded tool.

In an internal gear grinding machine according to a second invention to solve the above-described problem, the threaded tool is rotated about the tool rotation axis arranged vertically at the time of dressing.

In an internal gear grinding machine according to a third invention to solve the above-described problem further comprises tool turning means for turning the threaded tool about a tool pivot axis perpendicular to the work rotation axis.

A dressing method for barrel-shaped threaded tool according to a fourth invention to solve the above-described problem is a method of dressing a barrel-shaped threaded tool by meshing the threaded tool with a disk-shaped dresser, the threaded tool being formed into a barrel shape having a diameter gradually decreasing from an axially intermediate portion of the threaded tool toward axially opposite end portions thereof so that the threaded tool is meshed with a to-be-machined internal gear at a crossed axes angle therebetween during grinding of the to-be-machined internal gear, the to-be-machined internal gear being rotatable about a work rotation axis, the method comprising: rotating the dresser about a dresser rotation axis and turning the dresser about a dresser pivot axis perpendicular to the dresser rotation axis; and rotating the threaded tool about a tool rotation axis and moving the threaded tool in a vertical direction, a direction in which a distance between the tool rotation axis and the dresser rotation axis is adjusted, and a direction perpendicular to both the tool rotation axis and the direction in which the distance between the tool rotation axis and the dresser rotation axis is adjusted.

In a dressing method for barrel-shaped threaded tool according to a fifth invention to solve the above-described problem, the dresser turns about the dresser pivot axis such that a turning angle thereof about the dresser pivot axis varies approximately quadratically with respect to an axial position on the threaded tool at which the dresser comes into contact with the threaded tool, the threaded tool rotates about the tool rotation axis such that a rotation angle thereof about the tool rotation axis varies approximately linearly with respect to the axial position on the threaded tool at which the dresser comes into contact with the threaded tool, moves in the vertical direction such that an amount of travel thereof in the vertical direction varies approximately linearly with respect to the axial position on the threaded tool at which the dresser comes into contact with the threaded tool, moves in the direction in which the distance between the tool rotation axis and the dresser rotation axis is adjusted such that an amount of travel thereof in the direction in which the distance between the tool rotation axis and the dresser rotation axis is adjusted varies approximately quadratically with respect to the axial position on the threaded tool at which the dresser comes into contact with the threaded tool, and moves in the direction perpendicular to both the tool rotation axis and the direction in which the distance between the tool rotation axis and the dresser rotation axis is adjusted such that an amount of travel thereof in the direction perpendicular to both the tool rotation axis and the direction in which the distance between the tool rotation axis and the dresser rotation axis is adjusted varies approximately cubically with respect to the axial position on the threaded tool at which the dresser comes into contact with the threaded tool.

Effect of the Invention

Accordingly, the internal gear grinding machine and the dressing method for a barrel-shaped threaded tool according to the present invention make it possible to simplify the entire dressing operation by operating the threaded tool and the dresser in accordance with the shape of the threaded tool at the time of dressing. Thus, it is possible to achieve space savings and reduce the size of a machine.

BRIEF DESCRIPTION OF THE DRAWINGS

Part (a) and (b) of FIG. 5 are detailed views of a brake mechanism. Part (a) of FIG. 5 is a view showing a brake-off state, and part (b) of FIG. 5 is a view showing a brake-on state.

Part (a) to (e) of FIG. 10 are views showing the relationship between the operation of the threaded grinding wheel and the operation of the disc dresser at the time of dressing. Part (a) of FIG. 10 shows the relationship between an axial position on the threaded grinding wheel at which the disc dresser comes into contact with the threaded grinding wheel and the turning angle of the disc dresser about a dresser pivot axis. Part (b) of FIG. 10 shows the relationship between the axial position on the threaded grinding wheel at which the disc dresser comes into contact with the threaded grinding wheel and the rotation angle of the threaded grinding wheel about a grinding wheel rotation axis. Part (c) of FIG. 10 shows the relationship between the axial position on the threaded grinding wheel at which the disc dresser comes into contact with the threaded grinding wheel and the amount of travel of the threaded grinding wheel in the direction of the X axis. Part (d) of FIG. 10 shows the relationship between the axial position on the threaded grinding wheel at which the disc dresser comes into contact with the threaded grinding wheel and the amount of travel of the threaded grinding wheel in the direction of the Y axis. Part (e) of FIG. 10 shows the relationship between the axial position on the threaded grinding wheel at which the disc dresser comes into contact with the threaded grinding wheel and the amount of travel of the threaded grinding wheel in the direction of the Z axis.

MODE FOR CARRYING OUT THE INVENTION

Hereinafter, an internal gear grinding machine and a dressing method for a barrel-shaped threaded tool according to the present invention will be described in detail with reference to the drawings.

Embodiment

Figure 1:
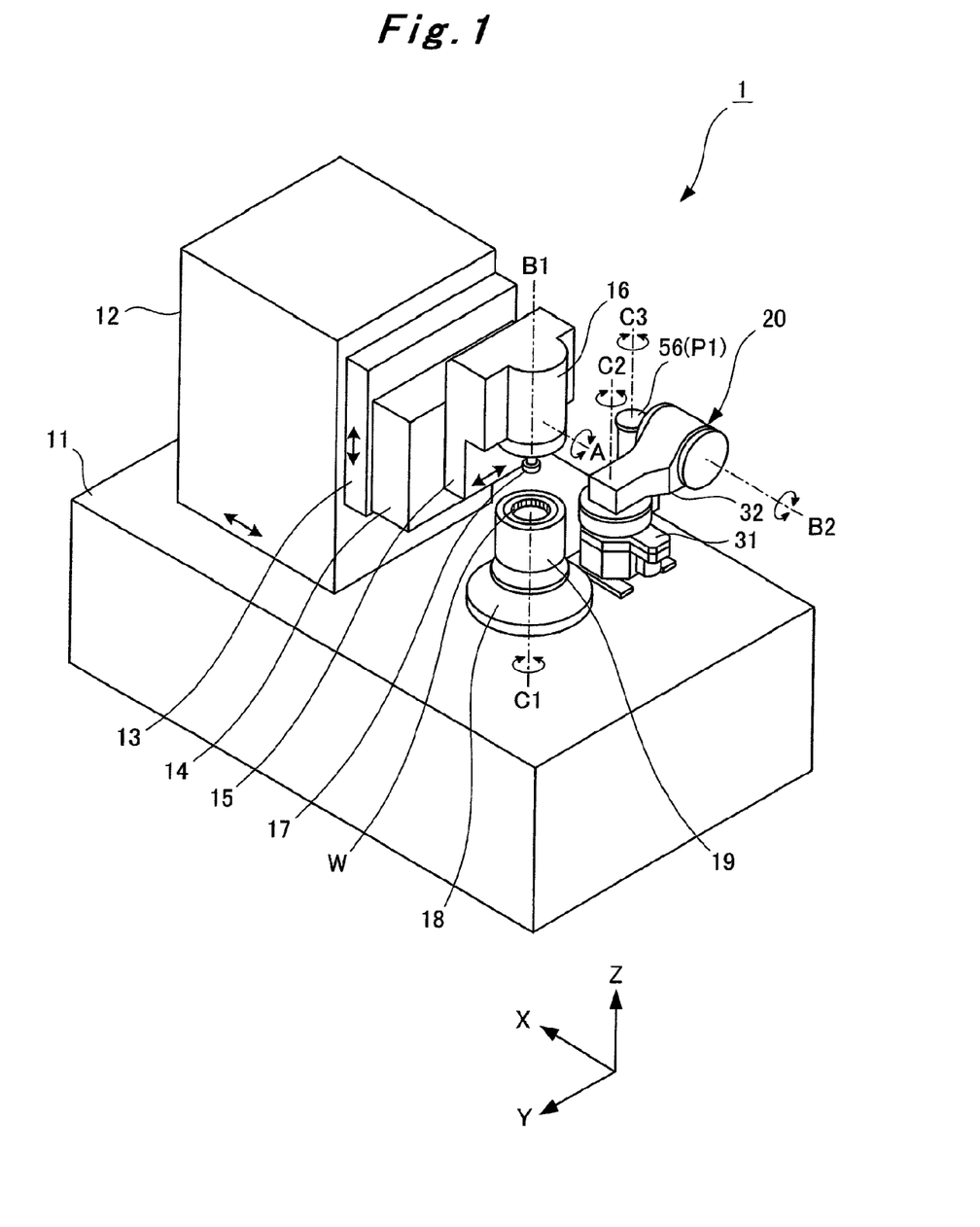
FIG. 1 is a perspective view of an internal gear grinding machine according to one embodiment of the present invention.

As shown in FIG. 1, a column (tool laterally-moving means) 12 is supported on a bed 11 of an internal gear grinding machine 1 to be movable in the direction of a horizontal X axis. On the column 12, a saddle (tool vertically-moving means) 13 is supported to be movable up and down in the direction of a vertical Z axis. On this saddle 13, a turning head (tool turning means) 14 is supported to be turnable about a horizontal grinding wheel pivot axis A. On the turning head 14, a slide head (tool horizontally-moving means) 15 is supported to be movable in the direction of a horizontal Y axis. This slide head 15 is provided with a grinding wheel head (tool rotating means) 16.

On the grinding wheel head 16, a grinding wheel arbor 16a (see FIG. 8) is supported to be rotatable about a grinding wheel rotation axis B1. To the lower end of this grinding wheel arbor 16a, a barrel-shaped threaded grinding wheel (threaded tool) 17 is removably attached. Details of this will be described later. Accordingly, driving the turning head 14 and the grinding wheel head 16 causes the threaded grinding wheel 17 to pivot about a grinding wheel pivot axis A and to rotate about the grinding wheel rotation axis B1.

Moreover, on the bed 11, a rotary table 18 is provided in front of the column 12 to be rotatable about a vertical work rotation axis C1. To the upper surface of the rotary table 18, a cylindrical mounting jig 19 is attached. To the inner circumferential surface of the upper end of this mounting jig 19, a workpiece W which is a to-be-machined internal gear is removably attached. Accordingly, driving the rotary table 18 causes the workpiece W to rotate about the work rotation axis C1.

Furthermore, a dressing device 20 is provided at a side of the rotary table 18 with respect to the direction of the Y axis. To this dressing device 20, a disk-shaped disc dresser 56 for dressing the threaded grinding wheel 17 is removably attached. It should be noted that the column 12, the saddle 13, the turning head 14, the slide head 15, the grinding wheel head 16, the dressing device 20 constitute dressing means, and a dresser turn drive motor (dresser turning means) 53 to be described later.

Figure 2:
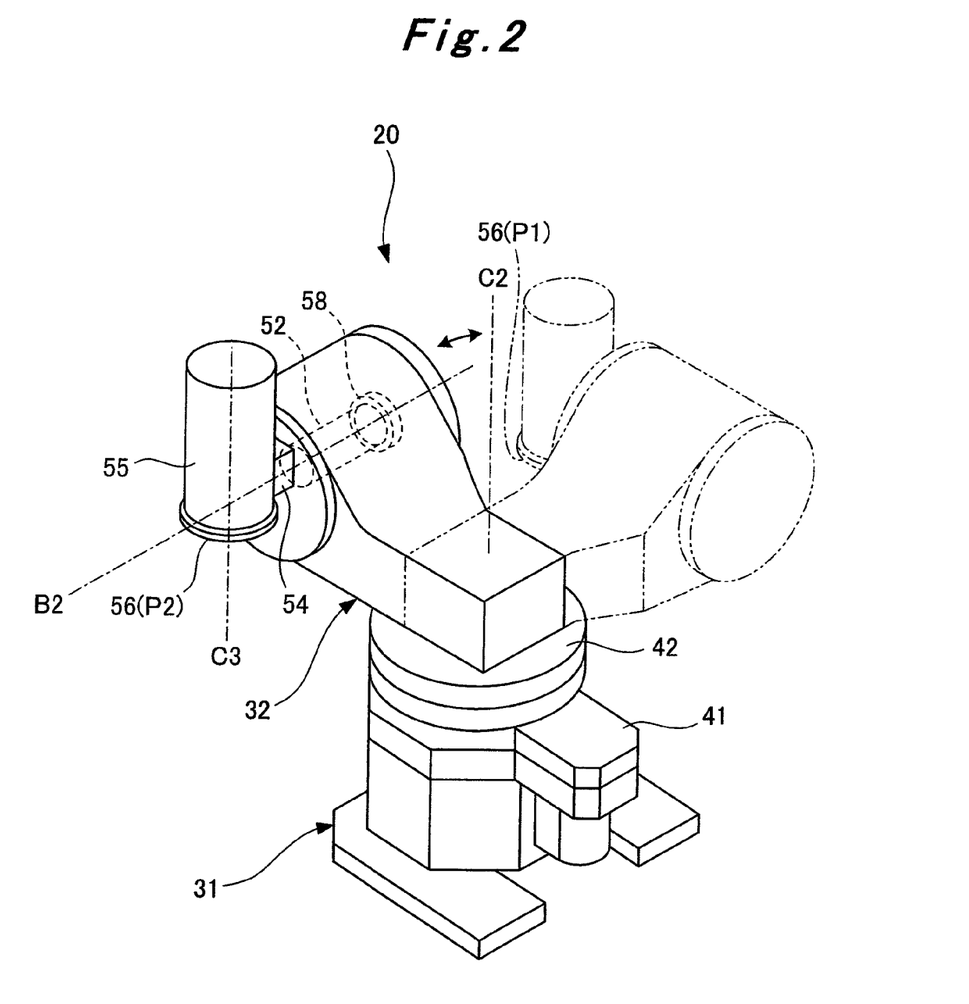
FIG. 2 is a perspective view of a dressing device.

As shown in FIGS. 1 and 2, the dressing device 20 includes a base unit 31 provided on the bed 11, and a pivoting unit 32 provided on this base unit 31. The base unit 31 includes a fixing portion 41 and a rotating portion 42. The fixing portion 41 is fixed to the upper surface of the bed 11. The rotating portion 42 is supported on the fixing portion 41 to be rotationally indexable about a vertical dresser advance/retreat axis C2. Further, the base end of the pivoting unit 32 is supported on a central portion of the upper surface of the rotating portion 42. In an end portion of this pivoting unit 32, a disc dresser 56 is attached.

Accordingly, in the dressing device 20, rotating the rotating portion 42 with respect to the fixing portion 41 of the base unit 31 causes the pivoting unit 32 to pivot about the dresser advance/retreat axis C2. Thus, the disc dresser 56 can advance or retreat between a dressing position P2 where the disk dresser 56 can dress the threaded grinding wheel 17 and a retreat position P1 where the disk dresser 56 retreats from the dressing position P2 at the time of grinding.

Next, the configuration of the pivoting unit 32 of the dressing device 20 will be described in detail with reference to FIGS. 2 to 5.

Figure 3:
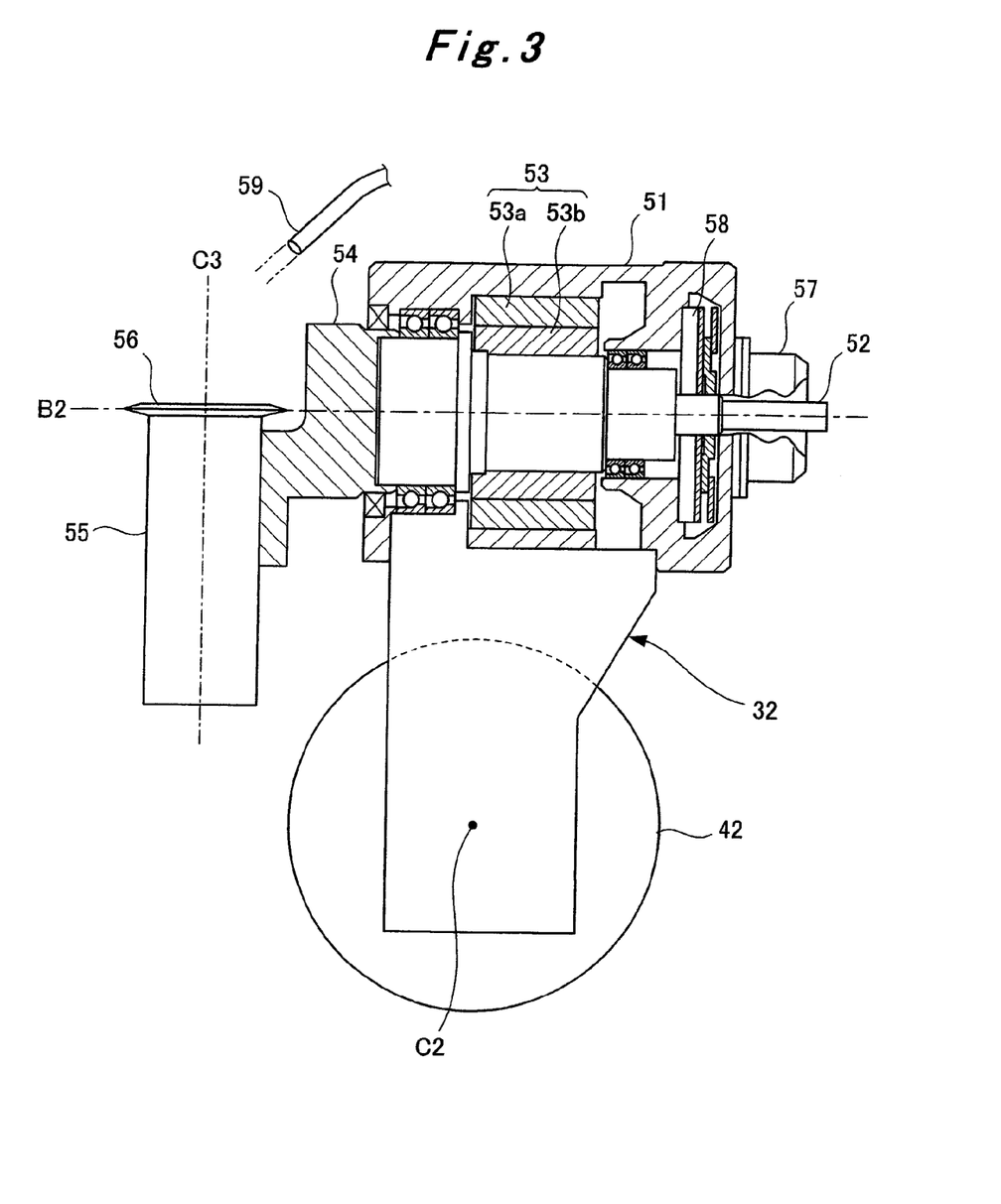
FIG. 3 is a partial sectional view of a pivoting unit of the dressing device.
Figure 4:
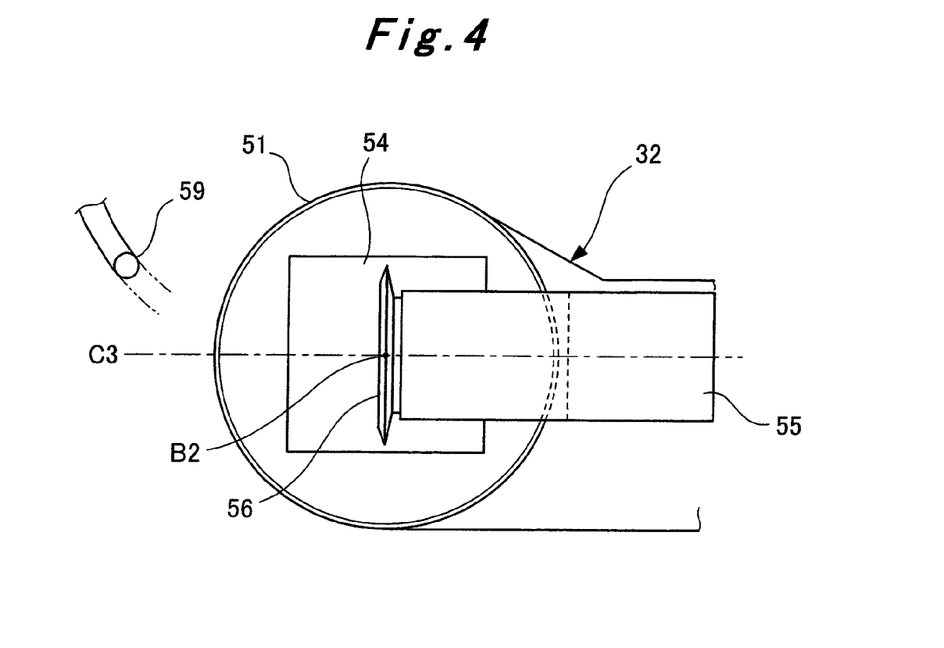
FIG. 4 is a front view of the pivoting unit of the dressing device.

As shown in FIGS. 2 to 4, a cylindrical housing portion 51 is formed in an end portion of the pivoting unit 32. In the housing portion 51, a rotary shaft 52 is housed to be rotatable about a horizontal dresser pivot axis B2 with a plurality of bearings interposed therebetween. Further, the direct-drive dresser turn drive motor (dresser turning means) 53 is interposed between the housing portion 51 and the rotary shaft 52.

This dresser turn drive motor 53 includes a stator 53*a* at an outer position and a rotor 53*b* disposed radially inward of this stator 53*a*. While the stator 53*a* is fixed on the inner circumferential surface of the housing portion 51, the rotor 53*b* is fixed on the outer circumferential surface of the rotary shaft 52. In other words, the rotor 53*b* rotates with respect to the stator 53*a* by driving the dresser turn drive motor 53, so that the rotary shaft 52 can rotate with respect to the housing portion 51.

Moreover, a dresser rotational drive motor 55 is supported on one end of the rotary shaft 52 with a support member 54 interposed therebetween. The output shaft of this dresser rotational drive motor 55 is rotatable about a dresser rotation axis C3, and the disc dresser 56 is attached to this output shaft. Accordingly, driving the dresser turn drive motor 53 and the dresser rotational drive motor 55 causes the disc dresser 56 to turn about the dresser pivot axis B2 and to rotate about the dresser rotation axis C3.

It should be noted that the dresser pivot axis B2 and the dresser rotation axis C3 are disposed perpendicular to each other, and this dresser pivot axis B2 is located to pass through the inside of the edge (faces) of the blade of the disc dresser 56 attached to the dresser rotational drive motor 55. In other words, the installation position of the disc dresser 56 is set such that the dresser pivot axis B2 passes through the inside of the edge of the blade thereof when the disc dresser 56 is attached to the dresser rotational drive motor 55.

On the other hand, to the other end of the rotary shaft 52, an encoder 57 is connected on the outside of the housing portion 51. Thus, whenever the rotary shaft 52 rotates, the rotation angle thereof is detected by the encoder 57. Further, a brake mechanism 58 which can stop the rotation of this rotary shaft 52 is provided between the other end of the rotary shaft 52 and the housing portion 51.

Figure 5A:
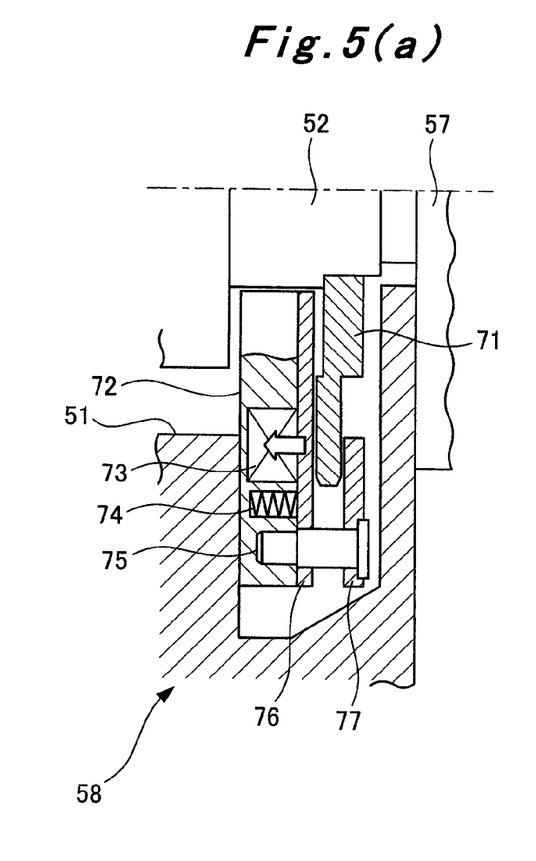

As shown in part (a) of FIG. 5, the brake mechanism 58 includes a rotary disk 71 on the rotary shaft 52 side and fixing members 72 on the housing portion 51 side. The rotary disk 71 is formed into the shape of a disk, and is keyed to the rotary shaft 52. Moreover, the fixing members 72 are disposed radially outward from the rotary shaft 52 at regular intervals in the circumferential direction thereof. While one ends of the fixing members 72 are fixed to the inner circumferential surface of the housing portion 51, other ends thereof can slidably contact the outer circumferential surface of the rotary shaft 52.

In each of these fixing members 72, a coil 73, a spring 74, and a support pin 75 are buried. The coil 73 is supplied with power to generate a magnetic force when the power of the internal gear grinding machine 1 is turned on. The spring 74 generates a biasing force in the axial direction (direction of the dresser pivot axis B2) of the rotary shaft 52 toward the outside of the fixing member 72 by one end thereof being supported in the fixing member 72.

To the outside of the rotary shaft 52, a disk-shaped armature 76 is fitted. The peripheral portion of this armature 76 is slidably supported by the support pins 75. The armature 76 is disposed in contact with the other ends of the springs 74. The support pins 75 further support a brake disk 77. Specifically, the rotary disk 71 fixed to the rotary shaft 52 is disposed to be interposed between the armature 76 and the brake disk 77 in the axial direction of the rotary shaft 52.

Accordingly, when the coils 73 are supplied with power, magnetic forces are generated in these coils 73, and therefore the armature 76 is attracted by the coils 73 against the biasing forces of the springs 74 as shown in part (a) of FIG. 5. Thus, a gap is formed between the rotary disk 71 and each of the armature 76 and the brake disk 77. As a result, the rotation of the rotary shaft 52 is permitted.

Figure 5B:
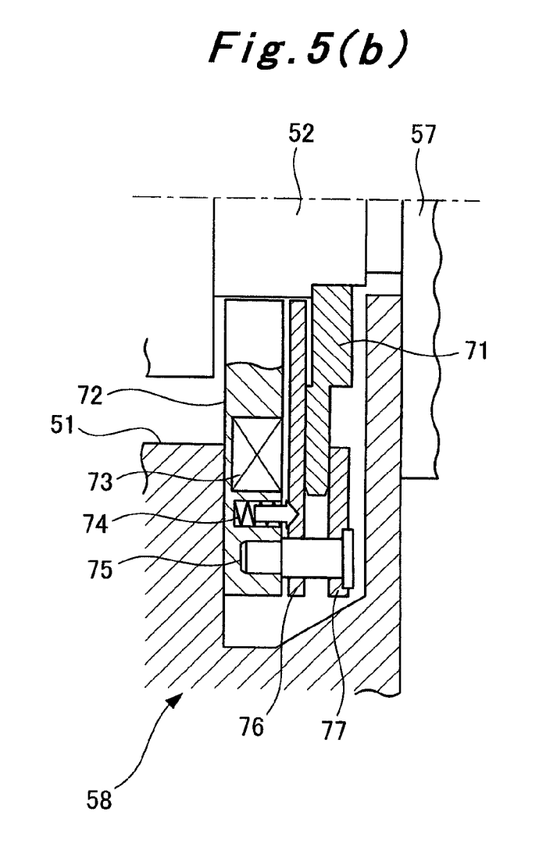

On the other hand, when the supply of power to the coils 73 is stopped, the magnetic forces of these coils 73 disappear, and therefore the armature 76 is slid toward the rotary disk 71 by the biasing forces of the springs 74 as shown in part (b) of FIG. 5. Thus, the rotary disk 71 is pressed against the brake disk 77 by the armature 76. As a result, the rotation of the rotary shaft 52 is stopped.

Moreover, an unillustrated coolant supply system is provided in the internal gear grinding machine 1. Coolant supplied from this coolant supply system is jetted toward a portion of the threaded grinding wheel 17 which is machined by the disc dresser 56 at the time of dressing. Thus, as shown in FIGS. 3 and 4, a coolant injection tip 59 for jetting the coolant is supported on the pivoting unit 32 of the dressing device 20.

Figure 6:
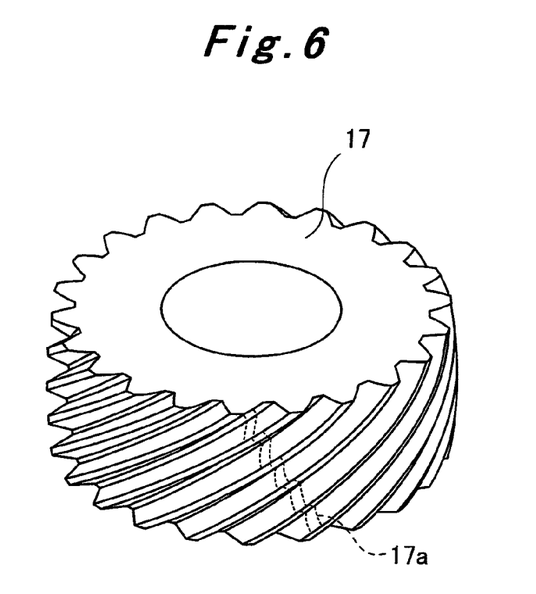
FIG. 6 is an external view of a threaded grinding wheel.
Figure 7:
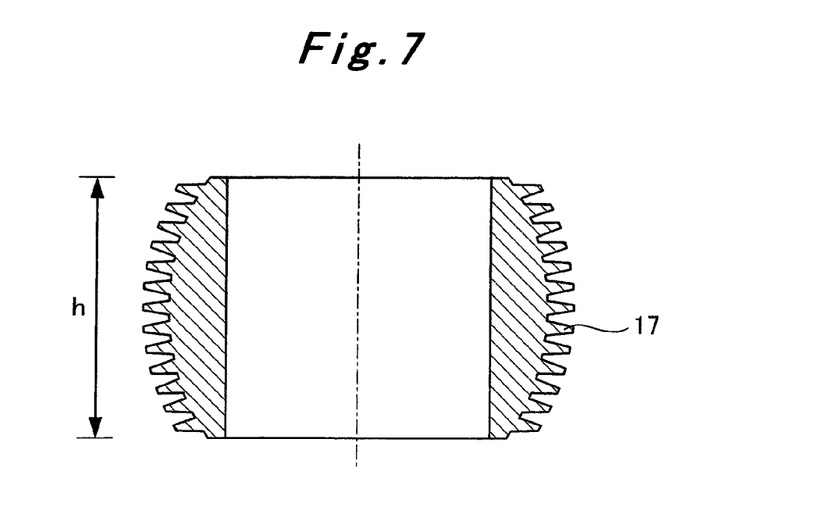
FIG. 7 is a vertical cross-sectional view of the threaded grinding wheel.
Figure 8:
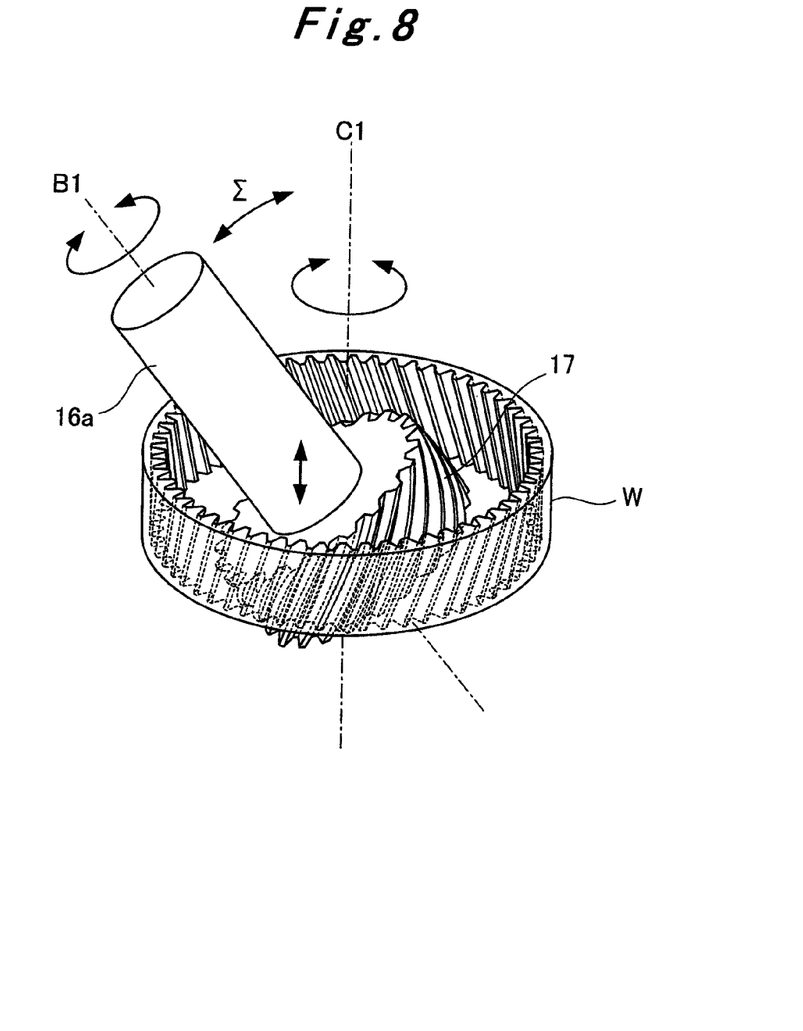
FIG. 8 is a view showing the threaded grinding wheel which is grinding a workpiece.

As shown in FIG. 8, the workpiece W to be ground by the internal gear grinding machine 1 has workpiece specifications from which a predetermined tooth profile can be obtained. The tooth profile is given a predetermined helix angle. On the other hand, as shown in FIGS. 6 and 7, the threaded grinding wheel 17 for grinding the workpiece W is formed into a barrel shape to have grinding wheel specifications which appropriately mesh with the workpiece specifications. The threads of the threaded grinding wheel 17 are given a predetermined helix angle. Specifically, the threaded grinding wheel 17 is formed into a barrel shape which has a diameter dimension gradually decreasing from an axially intermediate portion thereof toward axially opposite end portions thereof. The axial length (grinding wheel widthwise length) of the threaded grinding wheel 17 is a length h.

In the internal gear grinding machine 1, when the workpiece W is ground with the threaded grinding wheel 17, for the purpose of increasing grinding speed by increasing the relative velocity (slip velocity) occurring between the workpiece W and the threaded grinding wheel 17, the grinding wheel rotation axis B1 of the threaded grinding wheel 17 can be turned to intersect the work rotation axis C1 of the workpiece W at a predetermined crossed axes angle (hereinafter referred to as a shaft angle $\Sigma$). In other words, the threaded grinding wheel 17 rotates about the grinding wheel rotation axis B1 intersecting the work rotation axis C1 of the workpiece W at the shaft angle Σ. Accordingly, forming the threaded grinding wheel 17 into a barrel shape enables the threaded grinding wheel 17 installed at the shaft angle Σ to be meshed with the workpiece W.

Next, grinding and dressing operations of the internal gear grinding machine 1 will be described in detail with reference to FIGS. 2, 5, 6, and 8 to 10.

The grinding of the workpiece W with the internal gear grinding machine 1 starts with attaching the workpiece W to the mounting jig 19. Subsequently, the threaded grinding wheel 17 is moved in the directions of the X, Y, and Z axes by driving the column 12, the saddle 13, the turning head 14, and the slide head 15, and turned about the grinding wheel pivot axis A so as to be tilted at the shaft angle Σ corresponding to the helix angle of the workpiece W, thus being placed at the inside of the workpiece W.

Then, by driving the column 12, the threaded grinding wheel 17 is moved in the direction of the X axis (to the left in FIG. 1) to be meshed with the workpiece W (see FIG. 8). After that, the grinding wheel head 16 is driven to rotate the threaded grinding wheel 17 about the grinding wheel rotation axis B1, and the rotary table 18 is driven to rotate the workpiece W about the work rotation axis C1. Subsequently, the threaded grinding wheel 17 is moved up and down in the direction of the Z axis while being moved in the direction of the X axis by further driving the column 12 and the saddle 13. This causes the threaded grinding wheel 17 to cut into the workpiece W. As a result, the faces of the teeth of the workpiece W are ground by the faces of the threads of the threaded grinding wheel 17.

It should be noted that the meshing position of the threaded grinding wheel 17 with the workpiece W at the time of grinding is a contact (meshing) line 17a such as shown in FIG. 6. In other words, in the grinding of the workpiece W with the threaded grinding wheel 17, a plurality of thread faces of the threaded grinding wheel 17 grind a plurality of tooth faces of the workpiece W at the same time.

What should be noted here is that the use of the threaded grinding wheel 17 to grind a certain number of workpieces W causes a decrease in sharpness of the threaded grinding wheel 17 due to the wear of the faces of the threads thereof. To address this decrease, the dressing of the threaded grinding wheel 17 with the disc dresser 56 needs to be carried out on a regular basis.

The dressing of the threaded grinding wheel 17 with the disc dresser 56 starts with driving the base unit 31 of the dressing device 20 to rotate the rotating portion 42 with respect to the fixing portion 41. Thus, as shown in FIG. 2, the pivoting unit 32 pivots about the dresser advance/retreat axis C2, and the disc dresser 56 pivots by 90 degrees from the retreat position P1 to the dressing position P2.

Subsequently, the dresser turn drive motor 53 is driven to turn the disc dresser 56 about the dresser pivot axis B2 in accordance with the helix angle of the threaded grinding wheel 17, thus positioning the disc dresser 56. At this time, since the power to the internal gear grinding machine 1 is on, the coils 73 of the brake mechanism 58 are supplied with power, and the armature 76 is attracted by the coils 73 against the biasing forces of the springs 74 as shown in part (a) of FIG. 5. As a result, the rotation of the rotary disk 71 is permitted. Thus, a brake-off state is established, and the rotary shaft 52 is allowed to rotate.

On the other hand, the column 12, the saddle 13, and the slide head 15 are driven to move the threaded grinding wheel 17 in the directions of the X, Y, and Z axes so that the threaded grinding wheel 17 may face, in the direction of the Y axis, the disc dresser 56 disposed at the dressing position P2. It should be noted that during the above-described moving of the threaded grinding wheel 17 in a setup for grinding, the threaded grinding wheel 17 is turned by driving the turning head 14 so that the grinding wheel rotation axis B1 may extend in the vertical direction, and the turning angle (shaft angle Σ) is zero degrees.

Figure 9:
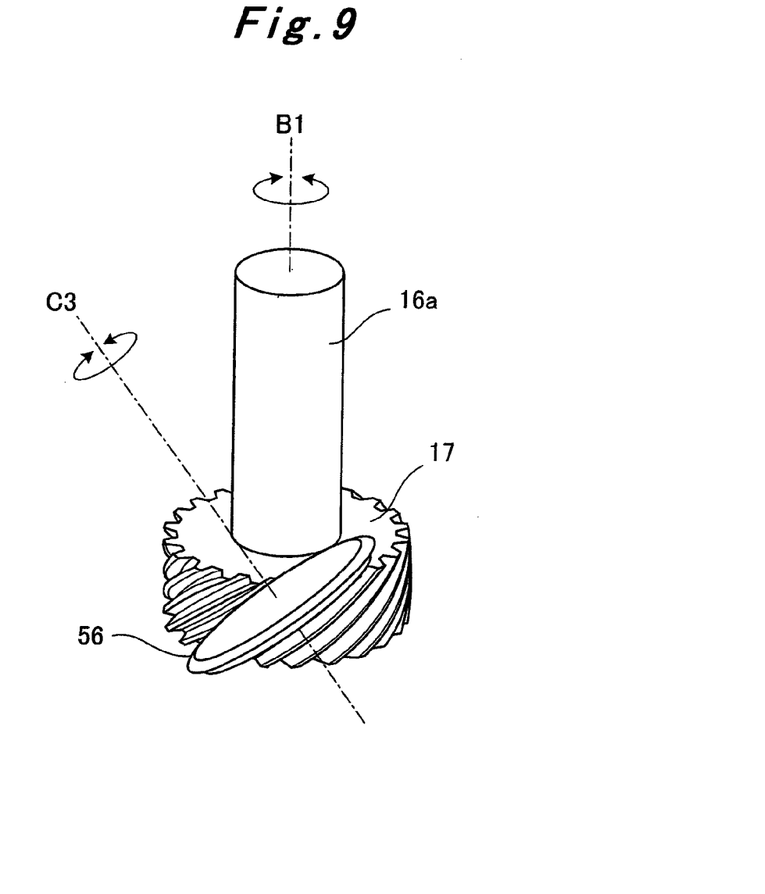
FIG. 9 is a view showing a disc dresser which is dressing the threaded grinding wheel.
Figure 10A:
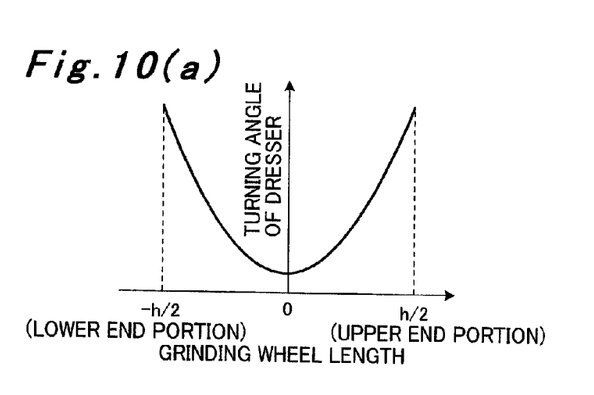
Figure 10B:
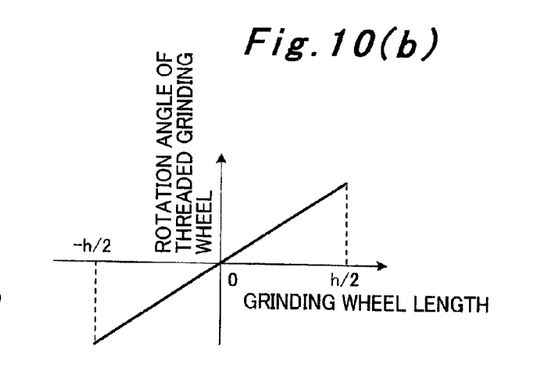
Figures 10C, 10D:
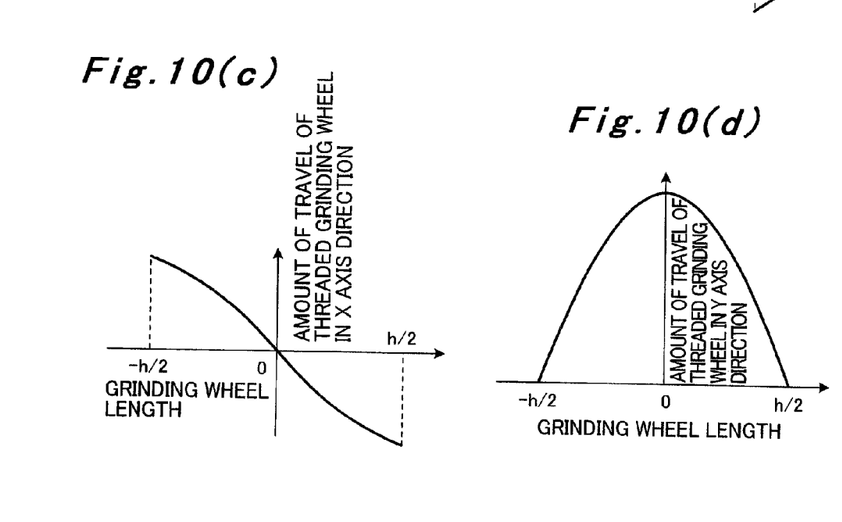
Figure 10E:
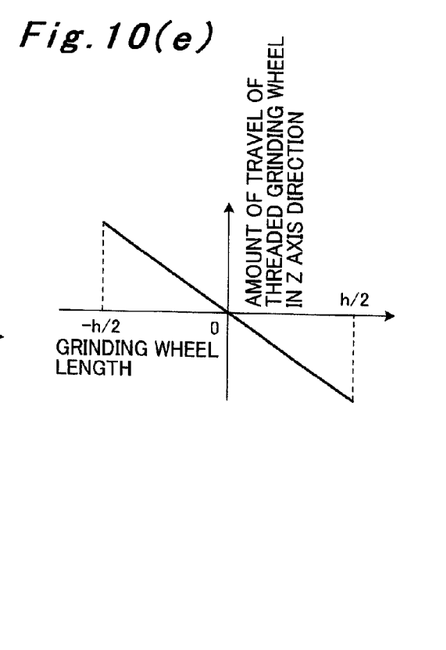

Subsequently, by driving the slide head 15, the threaded grinding wheel 17 is moved in the direction of the Y axis to be meshed with the disc dresser 56 placed at the dressing position P2 (see FIG. 9). Further, in the above-described meshing state, by driving the column 12, the saddle 13, the slide head 15, and the grinding wheel head 16 in accordance with the helix angle and barrel shape of the threaded grinding wheel 17, the threaded grinding wheel 17 is rotated about the grinding wheel rotation axis B1, moved in the directions of the X and Y axes, and at the same time moved up and down in the direction of the Z axis over the length h. Also, by driving the dresser turn drive motor 53 and the dresser rotational drive motor 55, the disc dresser 56 is turned about the dresser pivot axis B2 and rotated about the dresser rotation axis C3.

This causes the disc dresser 56 to cut into the threaded grinding wheel 17. As a result, the faces of the threads of the threaded grinding wheel 17 are dressed by the faces of the blade of the disc dresser 56. This dressing operation is performed a number of times equal to the number of thread grooves of the threaded grinding wheel 17. It should be noted that at the time of dressing, coolant is jetted from the coolant injection tip 59 toward the portion of the threaded grinding wheel 17 which is being machined by the disc dresser 56.

When the dressing operation is finished, the disc dresser 56 is pivoted from the dressing position P2 to the retreat position P1 to be brought to a waiting state, and a predetermined number of workpieces W are ground with the threaded grinding wheel 17 after dressing. Then, such a series of operations are repeated.

Next, the relationship between the movement of the threaded grinding wheel 17 and the movement of the disc dresser 56 at the time of the above-described dressing will be described in detail with reference to part (a) to (e) of FIG. 10.

First, part (a) of FIG. 10 shows the relationship between an axial position on the threaded grinding wheel 17 at which the disc dresser 56 comes into contact with the threaded grinding wheel 17 and the turning angle of the disc dresser 56 about the dresser pivot axis B2. The relationship therebetween can be approximately represented by a quadratic curve which is convex downward. Specifically, the turning angle of the disc dresser 56 is set to decrease to a minimum when the meshing position of the disc dresser 56 is at the axially intermediate portion of the threaded grinding wheel 17, and to gradually increase as the meshing position of the disc dresser 56 moves toward an upper or lower end portion of the threaded grinding wheel 17 with respect to the axial direction thereof. The reason for the above-described setting is that since the threaded grinding wheel 17 is in a barrel shape, the helix angle thereof increases from the axially intermediate portion thereof toward the axially opposite end portions thereof, and the turning angle of the disc dresser 56 also increases accordingly.

Part (b) of FIG. 10 shows the relationship between the axial position on the threaded grinding wheel 17 at which the disc dresser 56 comes into contact with the threaded grinding wheel 17 and the rotation angle of the threaded grinding wheel 17 about the grinding wheel rotation axis B1. The relationship therebetween can be approximately represented by a straight line. Specifically, the rotation angle of the threaded grinding wheel 17 is set to gradually increase in a clockwise direction as the meshing position of the disc dresser 56 moves toward the upper end portion of the threaded grinding wheel 17 with respect to the axial direction thereof, and to gradually increase in a counterclockwise direction as the meshing position of the disc dresser 56 moves toward the lower end portion of the threaded grinding wheel 17 with respect to the axial direction thereof.

Part (c) of FIG. 10 shows the relationship between the axial position on the threaded grinding wheel 17 at which the disc dresser 56 comes into contact with the threaded grinding wheel 17 and the amount of travel of the threaded grinding wheel 17 in the direction of the X axis. The relationship therebetween can be approximately represented by a cubic curve. Specifically, the amount of travel of the threaded grinding wheel 17 in the direction of the X axis is set to gradually increase in the direction in which the grinding wheel rotation axis B1 moves toward the work rotation axis C1 as the meshing position of the disc dresser 56 moves toward the upper end portion of the threaded grinding wheel 17 with respect to the axial direction thereof, and to gradually increase in the direction in which the grinding wheel rotation axis 31 moves away from the work rotation axis C1 as the meshing position of the disc dresser 56 moves toward the lower end portion of the threaded grinding wheel 17 with respect to the axial direction thereof. More specifically, the amount of travel of the threaded grinding wheel 17 in the direction of the X axis is point-symmetric about the point at which the axial position on the threaded grinding wheel 17 at which the disc dresser 56 comes into contact with the threaded grinding wheel 17 is the axially intermediate portion of the threaded grinding wheel 17. The amount of travel of the threaded grinding wheel 17 in the direction of the X axis varies slowly when the meshing position of the disc dresser 56 is near the axially intermediate portion, varies greatly when the meshing position starts moving from the axially intermediate portion toward the axially opposite end portions, and varies slowly when the meshing position comes near the axially opposite end portions.

Part (d) of FIG. 10 shows the relationship between the axial position on the threaded grinding wheel 17 at which the disc dresser 56 comes into contact with the threaded grinding wheel 17 and the amount of travel of the threaded grinding wheel 17 in the direction of the Y axis. The relationship therebetween can be approximately represented by a quadratic curve which is convex upward. Specifically, the amount of travel of the threaded grinding wheel 17 in the direction of the Y axis is set to increase to a maximum in the direction in which the grinding wheel rotation axis B1 moves away from the dresser rotation axis C3 when the meshing position of the disc dresser 56 is at the axially intermediate portion of the threaded grinding wheel 17, and to gradually increase in the direction in which the grinding wheel rotation axis B1 moves toward the dresser rotation axis C3 as the meshing position of the disc dresser 56 moves toward the upper or lower end portion of the threaded grinding wheel 17 with respect to the axial direction thereof. The reason for the above-described setting is that since the threaded grinding wheel 17 is in a barrel shape, the diameter dimension thereof gradually decreases from the axially intermediate portion thereof toward the axially opposite end portions thereof, and the depth of the cut by the disc dresser 56 also gradually increases accordingly.

Part (e) of FIG. 10 shows the relationship between the axial position on the threaded grinding wheel 17 at which the disc dresser 56 comes into contact with the threaded grinding wheel 17 and the amount of travel of the threaded grinding wheel 17 in the direction of the Z axis. The relationship therebetween can be approximately represented by a straight line. Specifically, the amount of travel of the threaded grinding wheel 17 in the direction of the Z axis is set to gradually increase vertically downward as the meshing position of the disc dresser 56 moves toward the upper end portion of the threaded grinding wheel 17 with respect to the axial direction thereof, and to gradually increase vertically upward as the meshing position of the disc dresser 56 moves toward the lower end portion of the threaded grinding wheel 17 with respect to the axial direction thereof.

Accordingly, operating the threaded grinding wheel 17 and the disc dresser 56 in accordance with the helix angle and barrel shape of the threaded grinding wheel 17 as described above causes the faces of the blade of the disc dresser 56 to come into contact with thread faces of the threaded grinding wheel 17 similar to tooth surfaces of the workpiece W, which come into contact (mesh) therewith along the contact line 17a, and to perform dressing.

Moreover, since the dresser turn drive motor 53 is a direct-drive motor, a backlash can be suppressed unlike in the case of a motor using a gear. This enables the disc dresser 56 to turn continuously and smoothly. Also, since the encoder 57 is connected to this dresser turn drive motor 53, the disc dresser 56 can be positioned with high accuracy with respect to the helix angle of the threaded grinding wheel 17.

Furthermore, since the coolant injection tip 59 is provided on the pivoting unit 32 of the dressing device 20 for advancing and retreating the disc dresser 56, when the disc dresser 56 is placed at the dressing position P2, the coolant injection tip 59 is also placed at a predetermined position. This eliminates the necessity of adjusting the position of the coolant injection tip 59 at the time of dressing.

It should be noted that in the case where an abnormal situation such as a blackout occurs during the use (driving) of the internal gear grinding machine 1 to cause the shutting off of the power thereof, the armature 76 is slid toward the rotary disk 71 by the biasing forces of the springs 74 as shown in part (b) of FIG. 5, because the supply of power to the coils 73 of the brake mechanism 58 is stopped and the magnetic forces of these coils 73 disappear. Thus, the rotary disk 71 is pressed against the brake disk 77 by the armature 76 to be brought to a state in which the brake is ON, thus stopping the rotation of the rotary shaft 52.

As a result, the turning of the disc dresser 56 caused by the coasting of the dresser turn drive motor 53 and an imbalance in the installation position of the dresser rotational drive motor 55 is stopped, and, further, the disc dresser 56 is maintained in that state. This reduces careless contact between the threaded grinding wheel 17 and the disc dresser 56, and prevents damage to the threaded grinding wheel 17 and the disc dresser 56.

In the above-described dressing device 20, the dressing position P2 of the disc dresser 56 is set to face the threaded grinding wheel 17 to be dressed in the direction of the Y axis. However, this dressing position P2 may also be set to face the threaded grinding wheel 17 to be dressed in the direction of the X axis. In the case of such a configuration, dressing can be performed by replacing the movement of the threaded grinding wheel 17 and the disc dresser 56 in the direction of the X axis with that in the direction of the Y axis.

Accordingly, in the internal gear grinding machine according to the present invention, by operating the threaded grinding wheel 17 and the disc dresser 56 in accordance with the helix angle and barrel shape of the threaded grinding wheel 17 at the time of dressing, the entire dressing operation is simplified, and the operating range thereof can be reduced to a minimum. Thus, it is possible to save the space occupied by the dressing device 20 and reduce the size thereof. As a result, the entire size of the internal gear grinding machine 1 can be reduced.

Moreover, after the threaded grinding wheel 17 placed at the shaft angle Σ at the time of grinding is turned so that the grinding wheel rotation axis B1 may extend in the vertical direction, dressing is performed on the threaded grinding wheel 17 in this state. Accordingly, the movement of the disc dresser 56 involves only turning about the dresser pivot axis B2. Thus, dressing operation can be further simplified.

Industrial Applicability

The present invention can be implemented to an internal gear grinding machine including a dressing device which can increase the speed of dressing operation at the time of non-grinding.

The invention claimed is:

1. A method of dressing a barrel-shaped threaded tool by meshing the threaded tool with a disk-shaped dresser, the threaded tool being formed into a barrel shape having a diameter gradually decreasing from an axially intermediate portion of the threaded tool toward axially opposite end portions thereof so that the threaded tool is meshed with a to-be-machined internal gear at a crossed axes angle therebetween during grinding of the to-be-machined internal gear, the to-be-machined internal gear being rotatable about a work rotation axis, the method being comprising:

rotating the dresser about a dresser rotation axis and turning the dresser about a dresser pivot axis perpendicular to the dresser rotation axis; and rotating the threaded tool about a tool rotation axis and moving the threaded tool in a vertical direction, a direction in which a distance between the tool rotation axis and the dresser rotation axis is adjusted, and a direction perpendicular to both the tool rotation axis and the direction in which the distance between the tool rotation axis and the dresser rotation axis is adjusted, wherein the dresser turns about the dresser pivot axis such that a turning angle thereof about the dresser pivot axis varies approximately quadratically with respect to an axial position on the threaded tool at which the dresser comes into contact with the threaded tool, the threaded tool rotates about the tool rotation axis such that a rotation angle thereof about the tool rotation axis varies approximately linearly with respect to the axial position on the threaded tool at which the dresser comes into contact with the threaded tool, moves in the vertical direction such that an amount of travel thereof in the vertical direction varies approximately linearly with respect to the axial position on the threaded tool at which the dresser comes into contact with the threaded tool, moves in the direction in which the distance between the tool rotation axis and the dresser rotation axis is adjusted such that an amount of travel thereof in the direction in which the distance between the tool rotation axis and the dresser rotation axis is adjusted varies approximately quadratically with respect to the axial position on the threaded tool at which the dresser comes into contact with the threaded tool, and moves in the direction perpendicular to both the tool rotation axis and the direction in which the distance between the tool rotation axis and the dresser rotation axis is adjusted such that an amount of travel thereof in the direction perpendicular to both the tool rotation axis and the direction in which the distance between the tool rotation axis and the dresser rotation axis is adjusted varies approximately cubically with respect to the axial position on the threaded tool at which the dresser comes into contact with the threaded tool.

2. A method of dressing a barrel-shaped threaded tool according to claim 1, wherein the threaded tool is moved in accordance with a helix angle and a barrel shape of the threaded tool.

* * * * *